(12) United States Patent
Shimasaki et al.

(10) Patent No.: US 7,104,051 B2
(45) Date of Patent: Sep. 12, 2006

(54) EXHAUST GAS PURIFICATION DEVICE

(75) Inventors: Yuichi Shimasaki, Saitama (JP);
Satoshi Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 10/715,820

(22) Filed: Nov. 19, 2003

(65) Prior Publication Data

US 2004/0128985 A1   Jul. 8, 2004

(30) Foreign Application Priority Data

Nov. 28, 2002   (JP) .............................. 2002-345948

(51) Int. Cl.
*F01N 3/00* (2006.01)

(52) U.S. Cl. .................... 60/297; 60/274; 60/286; 60/295; 60/303; 60/311

(58) Field of Classification Search ................ 60/274, 60/280, 285, 286, 295, 297, 303, 311
See application file for complete search history.

(56) References Cited

U.S. PATENT DOCUMENTS

| | | | | |
|---|---|---|---|---|
| 4,509,327 A | * | 4/1985 | Enga | ............................ 60/274 |
| 4,685,290 A | | 8/1987 | Kamiya et al. | |
| 5,746,989 A | * | 5/1998 | Murachi et al. | ......... 423/213.7 |
| 6,644,020 B1 | * | 11/2003 | Kuenstler et al. | ............. 60/286 |
| 6,698,192 B1 | * | 3/2004 | Ootake | ........................ 60/297 |
| 6,786,041 B1 | * | 9/2004 | Itoh et al. | ...................... 60/274 |
| 6,817,174 B1 | * | 11/2004 | Igarashi et al. | ............... 60/295 |
| 6,823,661 B1 | * | 11/2004 | Minami | ....................... 60/285 |

FOREIGN PATENT DOCUMENTS

| | | |
|---|---|---|
| EP | 0 743 429 A2 | 11/1996 |
| FR | 2 802 572 | 6/2001 |
| JP | 8-338229 | 12/1996 |

\* cited by examiner

*Primary Examiner*—Binh Q. Tran
(74) *Attorney, Agent, or Firm*—Arent Fox PPLC

(57) ABSTRACT

The invention provides an exhaust gas purification device that can prevent deterioration of the emission during a regeneration process for a particular filter for trapping particulates contained in the exhaust gas.

Particulate filter regeneration timing determining unit estimates the amount of particulates trapped by the particulate filter to determine the filter regeneration timing based on the estimated particular amount. In response to the regeneration timing determination, heating unit heats the particulate filter to raise an exhaust gas temperature, so that a particulate filter regeneration process starts. At this time, intake air amount reducing unit reduces the intake air amount to raise the exhaust gas temperature while combustion maintaining unit controls the combustion in the internal-combustion engine so as to be maintained in a desired condition.

6 Claims, 9 Drawing Sheets

EXHAUST GAS PURIFICATION DEVICE

BACKGROUND OF THE INVENTION

The present invention relates to an exhaust gas purification device for an internal-combustion engine, and more particularly it relates to a control scheme for burning and removing suspended particle matters (SPM, hereinafter referred to as a "particulate") which are generated from an internal-combustion engine and trapped by a particulate filter that is operable to trap and remove the particulates.

Particulates which are exhausted from an internal-combustion engine includes such particle matters as soot particles, various hydrocarbon particles and other insoluble organic matters (SOOT) on which unburned fuel, unburned oil constituents and other soluble organic matters (SOF) and/or sulfur oxide matters are deposited, the sulfur oxide matters being produced. There has been conventionally developed a diesel particulate filter (DPF) for trapping those particulates contained in the exhaust gas. Through use of such particulate filter, it is possible to trap more than 95% of the particulates contained in the exhaust gas.

A particulate filter comprises porous honeycomb cores of ceramic or the like so as to trap the particulates when the exhaust gas passes through the wall of porous material. Accordingly, as the particulates are deposited, the exhaust gas pressure increases. The increase in the exhaust gas pressure may cause a backpressure to the internal-combustion engine, which may further result in deterioration of fuel consumption and/or bad condition of the internal-combustion engine. Therefore, it is required to remove the particulates trapped by the particulate filter to regenerate or clean the filter every time the travel distance of the vehicle reaches several hundred or several thousand kilometers.

As an example of a system for regenerating or cleaning a particulate filter of the vehicle, the Japanese Patent Application Unexamined Publication (Kokai) No. HEISEI 8-338229 discloses an exhaust gas purification device comprising an electric heater, an oxidation catalyst and a particulate filter which are arranged within an exhaust gas passage in this sequence from the upstream side wherein at a time of a filter cleaning, an intake air amount is reduced and diesel fuel is supplied to an exhaust pipe while the electric heater is heated.

However, when the fuel is supplied to the exhaust pipe, reduction of the intake air amount in order to raise the exhaust gas temperature produces a problem that the emission gets worse due to deterioration of the combustion condition of the internal-combustion engine.

Besides, as for diesel engines, lean burn operations with excessive air are conventionally carried out in almost all operational ranges. No sensors that can detect the air/fuel ratio in the lean range with higher precision have been developed. Thus, there are no systems for performing a feedback control of the air/fuel ratio of the exhaust gas. For this reason, there are such problems as the emission gets worse due to instability of the air/fuel ratio of the exhaust gas, and as the regeneration process for the particulate filter cannot be stabled due to instability of the exhaust gas temperature when the particulate filter is cleaned through post-injection.

Thus, it is an objective of the present invention to provide an exhaust gas purification device for an internal-combustion engine which can solve at least one of the above-described problems.

SUMMARY OF THE INVENTION

According to one aspect of the present invention, an exhaust gas purification device comprises a particulate filter disposed in an exhaust system of the internal-combustion engine for trapping particulates contained in the exhaust gas, and means for determining a regeneration timing to remove the particulates trapped by the particulate filter. The device also includes means for reducing an intake air amount to be taken into the internal-combustion engine in response to the determination of the regeneration timing, and means for maintaining the combustion of the internal-combustion engine in a desired condition in response to the decrease of the intake air amount. The device farther includes means for heating the particulate filter to regenerate the particulate filter.

According to this aspect of the invention, when the estimated amount of the particulates trapped by the particulate filter exceeds a threshold value, the particulate filter regeneration process is performed in which the exhaust gas temperature is raised in order to burn and remove the particulates. During this regeneration process, the combustion in the internal-combustion engine is kept in a desirable condition while the intake air amount is being reduced, so that the deterioration of the emission during the filter cleaning process can be avoided while the exhaust gas temperature is raised.

In the above-described structure, "means for decreasing the intake air amount" specifically includes, for example, a throttle valve disposed in an air intake system of the internal-combustion engine or a supercharger disposed in an exhaust system of the internal-combustion engine. As for the former case, the intake air amount that is taken into the internal-combustion engine is decreased by closing the throttle valve. As for the latter case, the thermal energy supplied to the air intake system of the internal-combustion engine is decreased by decreasing the supercharging pressure by the supercharger, so that the intake air amount is reduced.

Besides, the above-described "means for maintaining combustion" specifically includes, for example, a swirl control valve or an EGR (Emission Gas Recirculation) valve. As for the former case, the swirl strength inside the combustion chamber of the internal-combustion engine is increased by closing the swirl control valve, so that the combustion in the internal-combustion engine can be improved. As for the latter case, the deterioration of the emission during the exhaust stroke of the internal-combustion engine is prevented by closing the EGR valve. As for the EGR valve, in some situations, the emission may be improved by opening the EGR valve. Therefore, the opening or closing of the EGR valve is determined according to the characteristic of the internal-combustion engine.

According to another aspect of the present invention, an exhaust gas purification device includes a particulate filter disposed in an exhaust system of the internal-combustion engine for trapping particulates contained in the exhaust gas, means for determining a regeneration timing to remove the particulates trapped by the particulate filter, and means for decreasing an intake air amount to be taken into the internal-combustion engine in response to the determination of the regeneration timing. The device also includes means for heating the particulate filter to regenerate the particulate filter, and means for performing a feedback control to converge an air/fuel ratio in the exhaust system of the internal-combustion engine to a predetermined desired air/fuel ratio when the intake air amount is decreased by the means for decreasing intake air amount.

According to this aspect of the invention, during the regeneration process for the particulate filter, the emission can be stabilized and the exhaust gas temperature can also be stabilized because the feedback control is performed based on the detected air/fuel ratio of the exhaust system to maintain the air/fuel ratio of the exhaust gas at a constant level. Furthermore, as the heat generated in the exhaust gas purification device is stabilized, the temperature of the particulate filter is stabilized. As a result, no abnormal rise in the temperature happens and the combustion never stops.

As for the above-described feedback control, there may be two variations. The first variation maintains the air/fuel ratio of the exhaust gas at a constant level during the regeneration process for the particulate filter by correcting the fuel injection amount based on the detected air/fuel ratio of the exhaust gas. More specifically, a feedback loop as shown in FIG. 6 is used.

Even though the first variation allows for achievement of the objective that the exhaust air/fuel ratio be kept constant, it is preferable to extend a conventional approach to perform an air/fuel feedback control rather than newly providing means for calculating the fuel injection amount because an ordinary diesel engine control adopts an open loop control by which the fuel is supplied in accordance with the accelerator opening regardless of the intake air amount. Therefore, the second variation of the air/fuel ratio feedback control controls the air/fuel ratio of the exhaust gas to be constant during the particulate filter regeneration process by correcting the intake air amount to be taken in the engine based on the detected air/fuel ratio of the exhaust gas. More specifically, a feedback loop as shown in FIG. 8 is used. It should be noted that the air/fuel ratio feedback control is not limited to these variations.

According to yet another aspect of the present invention, an exhaust gas purification device for an internal-combustion engine comprises a particulate filter disposed in an exhaust system of the internal-combustion engine for trapping particulates contained in the exhaust gas, and means for determining a regeneration timing to remove the particulates trapped by the particulate filter. The device also includes means for heating the particulate filter, and means for supplying unburned fuel into the exhaust gas when a predetermined time elapses after the heating means started to work.

According to this aspect of the invention, the fuel injection in the exhaust stroke of the internal-combustion engine (post-injection) is not started before a certain waiting time elapses after a signal instructing particulate filter regeneration is output and the heating means such as an electric heater is turned on. In this waiting time, the heater can be warmed up to a sufficient temperature (for example 500 degree C.) for regenerating the particulate filter. This operation allows for preventing the post-injected fuel in a liquid state (due to incomplete burning) from sticking to the particulate filter or from being released to the atmosphere. The waiting time (5 seconds in case of this aspect of the invention) is determined in accordance with the heating capacity of the particulate filter and/or the capability of the heating means.

It should be noted that the above-described means for decreasing intake air amount, means for maintaining combustion, heating means, means for controlling air/fuel ratio feedback and means for supplying unburned fuel may be used in any combination. For example, the post-injection may be performed by the means for supplying unburned fuel while the air/fuel ratio feedback control is performed.

DESCRIPTION OF THE PREFERRED EMBODIMENTS

Preferred embodiments will now be described with reference to the accompanying drawings.

Figure 1:
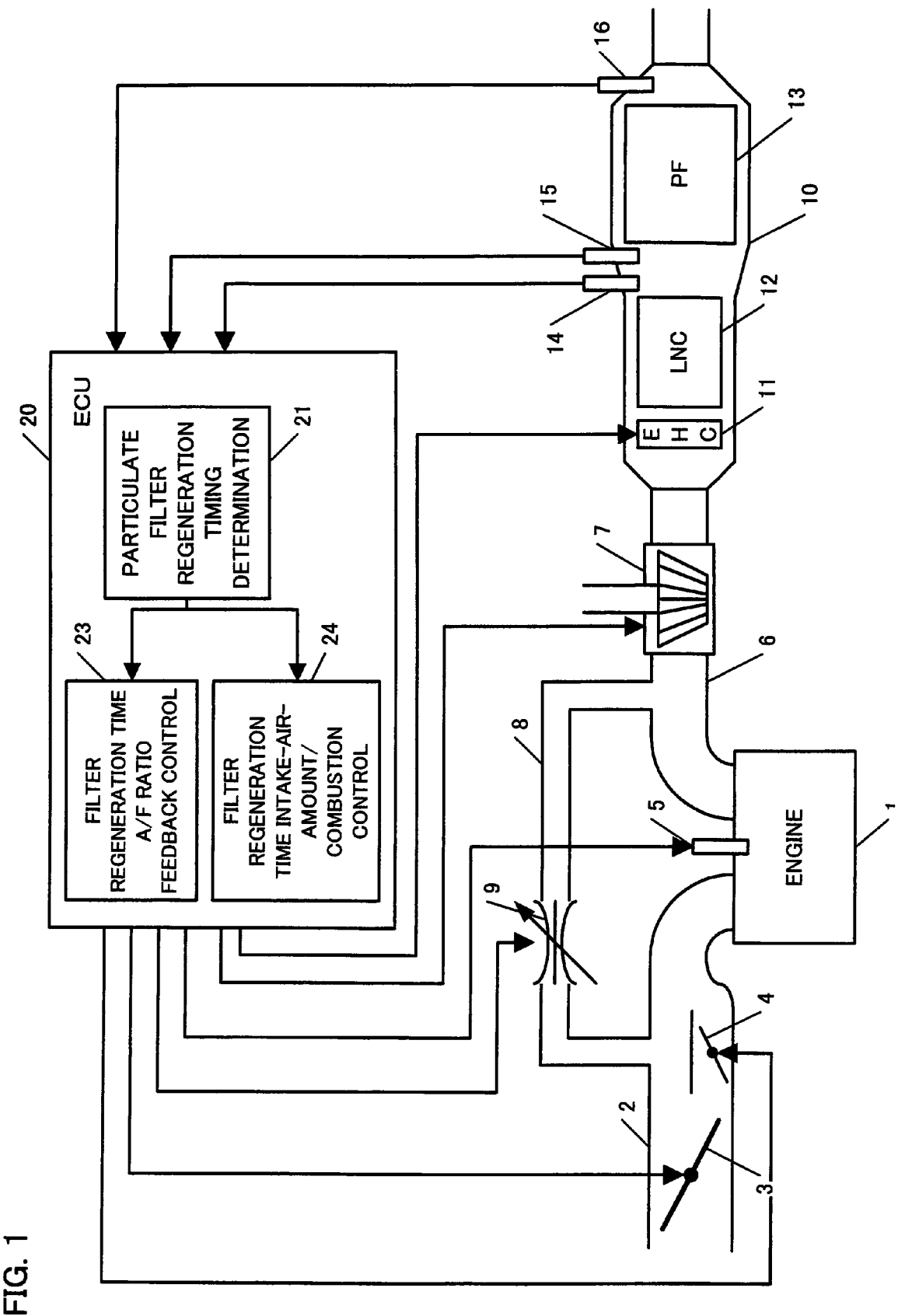
FIG. 1 shows an overall system structure of an internal-combustion engine in which an exhaust gas purification device in accordance with the present invention is applied.

FIG. 1 shows an overall system structure of an internal-combustion engine in accordance with one embodiment of the present invention. In FIG. 1, the air is supplied to a combustion chamber of each cylinder of an internal-combustion engine (hereinafter referred to as "engine") 1 through an air intake pipe 2. Each cylinder of the engine 1 is provided with an air intake valve and an exhaust valve (both not shown) to perform air intake/exhaust control. Additionally, the combustion chamber of each cylinder of the engine 1 is provided with a fuel injection valve 5. The fuel injection valve 5 is connected to a fuel supply pump (not shown) to inject a certain amount of fuel into the combustion chamber with an appropriate timing under a control of an electronic control unit (hereinafter referred to as "ECU") 20. The injected fuel amount is determined in accordance with a request torque that is obtained through a search on a map that is predetermined based on such operational conditions as an engine rotational speed and/or an accelerator opening. When the fuel is injected from the fuel injection valve 5, the air fuel mixture burns in the combustion chamber and the exhaust gas is discharged into an exhaust pipe 6.

Although the engine 1 is preferably a diesel engine, application of the exhaust gas purification device of the present invention is not limited to the diesel engine but it can also be applied to any gasoline engine employing the scheme that fuel is injected directly into a combustion chamber. Besides, the present invention can be applied to such a vessel-propelling engine as an outboard motor having a vertically extending crankshaft.

The air intake pipe 2 comprises a throttle valve 3 for adjusting a flow amount of air that flows into the air intake pipe. The air intake pipe 2 additionally includes a swirl control valve (SCV) 4 for generating a swirl in each cylinder of the engine 1 to enhance the combustion efficiency.

Each of the throttle valve 3 and the swirl control valve 4 is provided with an actuator (not shown) for opening/closing the throttle valve 3 or the swirl control valve 4 respectively. These actuators are controlled by signals from the ECU 20.

A supercharger 7 is disposed in the midway of the exhaust pipe 6. The supercharger 7 comprises a turbine disposed within the exhaust pipe 6, a compressor (not shown) disposed within the exhaust pipe 6, a shaft for connecting the turbine with the compressor and other elements. When the exhaust gas discharged from the combustion chamber of each cylinder of the engine 1 turns the turbine of the supercharger 7, the compressor starts to rotate via the shaft, so that the air inside the intake pipe 2 is compressed and supplied to each combustion chamber. The supercharger 7 includes an actuator for controlling the air intake amount by altering the size of the open area of the portion into which the exhaust gas flows. This actuator is controlled by signals from the ECU 20.

The supercharger 7 may be a variable geometry type of supercharger. In this case, the intake air amount can be controlled by altering a vane of the supercharger 7.

Furthermore, an exhaust gas recirculation (EGR) passage 8 is disposed in the midway of the exhaust pipe 6, connecting the exhaust pipe 6 with the air intake pipe 2. In the midway of the EGR passage, an EGR valve 9 is disposed. An amount of the exhaust gas that recirculates into the air intake pipe 2 from the exhaust pipe 6 can be controlled by adjusting the opening of the EGR valve 9. The exhaust gas that recirculates into the air intake pipe 2 through the EGR passage 8 is mixed with the fresh air flowing from the upstream of the air intake pipe 2. The mixed air is introduced into the combustion chamber of each cylinder of the engine 1 to burn. In this way, the density of the NOx contained in the exhaust gas can be reduced. An actuator (not shown) is attached to the EGR valve 9 to drive the EGR valve. The actuator is controlled by a signal from the ECU 20.

The exhaust gas passes through the exhaust pipe 6 and then flows into an exhaust gas purification device 10. The exhaust gas purification device 10 includes an electric heater (EHC) 11, a lean NOx catalyst (LNC) 12 and a particulate filter (PF) 13, which are arranged in this sequence from the upstream side. As an alternative of the electric heater, an energizing-fever type catalytic converter may be used. Moreover, an oxidation catalyst (DOC) may be arranged between the electric heater 11 and the lean NOx catalyst 12 in order to promote oxidation (combustion) of the fuel.

The particulate filter 13 comprises a plurality of passages that are formed from a honeycomb type of ceramics, a porous type of metallic material or the like. The passages contain two types of passages which are arranged alternately each other. The first type of passage has a stopper on the upstream side and the second type of passage has a stopper on the downstream side. A thin wall of ceramics or porous metals located between each pair of these passages acts as a filter. Thus, when the exhaust gas containing the particulates flows into one of the passages (the exit of the passage is blocked by the stopper) and passes through very small holes of the filter wall into the adjacent passage, the particulates are trapped by the thin wall.

The lean NOx catalyst 12 is a NOx-adsorbing type of catalyst. It adsorbs NOx with a NOx adsorbent in a lean condition when the air/fuel ratio of the exhaust gas is smaller than a stoichiometric air/fuel ratio. In a rich condition when the air/fuel ratio of the exhaust gas is larger than the stoichiometric air/fuel ratio, the absorbed NOx is reduced by HC, CO and discharged as a nitrogenous gas, and at the same time the HC, CO are oxidized and discharged as vapor and carbon dioxide.

As for the diesel engine, a lean operation is performed during an ordinary operation, so that the lean NOx catalyst 12 adsorbs NOx contained in the exhaust gas. The ability of the NOx catalyst is recovered by temporarily injecting and supplying the fuel into the combustion engine during an exhaust stroke of the engine 1 (post-injection) to make the exhaust gas richer. It should be noted that this post-injection operation is also performed in order to raise the exhaust gas temperature to clean the particulate filter. This subject will be described later.

On the upstream side of the particulate filter 13, there are provided an air/fuel ratio sensor (hereinafter referred to as "LAF sensor) 14 for generating respective levels of outputs in proportion to a wide range of the air/fuel ratio of the exhaust gas and a pressure sensor 15 for detecting the pressure inside the exhaust pipe. Besides, on the downstream side of the particulate filter 13, there is provided a temperature sensor 16 for detecting the temperature inside the exhaust pipe. The outputs of these sensors are transmitted to the ECU 20.

When the amount of the particulates trapped by the particulate filter 13 increases, the cross section area of the exhaust channel in the particulate filter 13 decreases and the exhaust flow is obstructed. As a result, the pressure of the exhaust pipe 6 on the upstream side of the particulate filter rises, which may influence the performance of the engine 1. For this reason, the ECU 20 estimates the amount of the particulates trapped by the particulate filter 13 and performs a filter regeneration process by heating the particulate filter to burn and remove the trapped particulates when the estimated amount of the trapped particulates exceeds a predetermined value. By this filter regeneration process, the collection capability of the particulate filter 13 is maintained.

Although there are various methods for heating the particulate filter 13, this embodiment of the present invention applies a method of heating the electric heater 11 and at the same time supplying the fuel to the inside of the exhaust pipe through the post-injection operation to burn the fuel. Accordingly, the temperature of the particulate filter 13 rises (for example, higher than 500 degree C.), so that the trapped particulates burn out. Furthermore, the exhaust gas temperature is also increased by closing the throttle valve 3 slightly to reduce the intake air amount. At this operation, in order to keep the engine 1 in an optimal combustion condition, swirl strength, the exhaust flow through the EGR passage 8, the supercharged pressure by the supercharger 7 and other factors are adjusted.

The above-described various processes are performed by the ECU 20. The ECU 20 comprises a computer, which includes an input interface for processing input signals from various sensors, a ROM for storing programs and data, a RAM for temporarily storing the programs and the data required at the run time and providing a working space for calculations, a CPU for performing various control programs and an output interface for sending control signals to each section of the vehicle. The signals transmitted from each of the above-described sensors are received by the input interface and processed in accordance with the programs stored in the ROM. Considering such hardware structure, the ECU 10 is represented by functional blocks in FIG. 1.

A particulate filter regeneration timing determination unit 21 first calculates an amount of the particulates trapped by the particulate filter 13 based on such factors as the internal pressure of the exhaust pipe which is detected by the pressure sensor 15, the exhaust gas temperature on the down stream side of the particulate filter which is detected by the temperature sensor 16, the fuel injection amount and the engine rotational speed. As an example, the ROM of the ECU 20 pre-stores the relation of the above-described operational conditions with the amount of particulates trapped by the particulate filter in a map format, so that the timing determination unit 21 can calculate the amount of the particulates by searching this map. Alternatively, the amount of the trapped particulates may be estimated based on the uptime of the engine 1.

Subsequently, when the estimated amount of the particulates reaches a predetermined threshold value, the timing determination unit 21 determines that a regeneration timing for removing the particulates from the particulate filter has come and then starts a particulate filter regeneration process. The particulate filter regeneration process is terminated either when a given time elapses after the particulate filter regeneration process started or when the exhaust pipe internal pressure detected by the pressure sensor 15 becomes lower than a given value. Signals indicating these determinations are transmitted to a filter regeneration time A/F feedback control unit 23 and a filter regeneration time intake-air-amount/combustion control unit 24.

The control unit 24 (this unit will be hereinafter referred to as "an intake-air-amount/combustion control unit") responds to the above-described regeneration determination and, prior to the post-injection operation, performs respective processes of reducing the intake air amount in order to raise the exhaust gas temperature and starting the power supply to the electric heater 11. The control unit 24 further performs respective processes of preventing deterioration of the combustion in the engine due to the decrease of the intake air amount. These processes will be more specifically described later with reference to FIG. 3 and FIG. 4.

When the intake air amount is reduced by the control unit 24, the feedback control unit 23 performs a feedback control to control either post-injection amount or intake air amount in order to maintain the exhaust air/fuel ratio at a constant level. The objective of this feedback control is to solve some problems including deterioration of the emission during the post-injection operation performed for regenerating the particulate filter. Accordingly, this feedback control is performed only while the filter regeneration process is being carried. Therefore, it should be noted that this feedback control is not intended to determine the fuel injection amount to output a request torque corresponding to the depression amount of the accelerator pedal.

The present specification describes two embodiments which implement such feedback control. Those embodiments will be described later with reference to FIG. 5 through FIG. 9.

Figure 2:
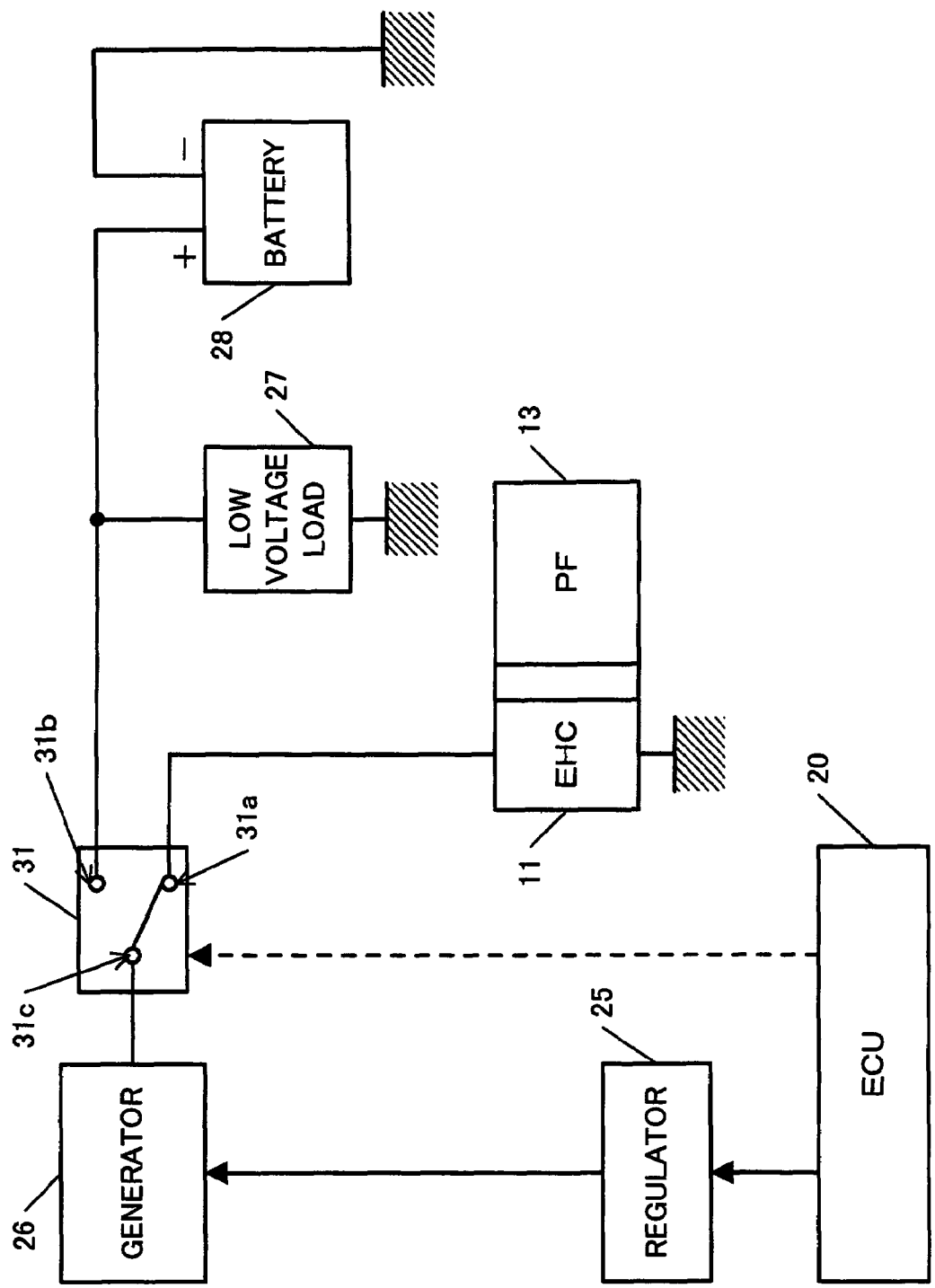
FIG. 2 schematically shows a power supply system for the internal-combustion engine shown in FIG. 1.

FIG. 2 schematically shows a power supply system for the internal-combustion engine shown in FIG. 1. A regulator 25 can switch the output voltage of a generator (alternator) 26 between a high voltage (for example, 30V) and a low voltage (for example, 14V) in accordance with a signal from the ECU 20. The generator 26 is connected to a low voltage load 27 and the electric heater 11 via a three-terminal switch 31. In addition, a battery 28 (for example, a 12V battery) is connected to the low voltage load 27 in order to store redundant electric power. The low voltage load 27 includes various loads within a concerned vehicle, for example, lights, an air conditioner, an audio system and so on.

The three-terminal switch 31 can be switched by a signal from the ECU 20. At a normal operation time, the generator 26 outputs the low voltage and it is connected to the low voltage load 27 and the battery 28. When a start of regeneration of the particulate filter 13 is determined by the timing determination unit 21, a contact point 31c is connected to a contact point 31a in response to that determination. Furthermore, the output voltage of the generator 26 is set to the high voltage by the regulator 25. Thus, the high voltage from the generator 26 is applied to the electric heater 11, and the regeneration process for the particulate filer 13 is started. While the electric power is being supplied to the electric heater 11, the power supply to the low voltage load 27 is supported by the battery 28.

When a termination of the regeneration of the particulate filter 13 is determined by the timing determination unit 21, the contact point 31c is connected to a contact point 31b in response to that determination. Furthermore, the output voltage of the generator 26 is set to the low voltage by the regulator 25. Thus, the generator 26 is connected again to the low voltage load 27 and the battery 28.

Figure 3:
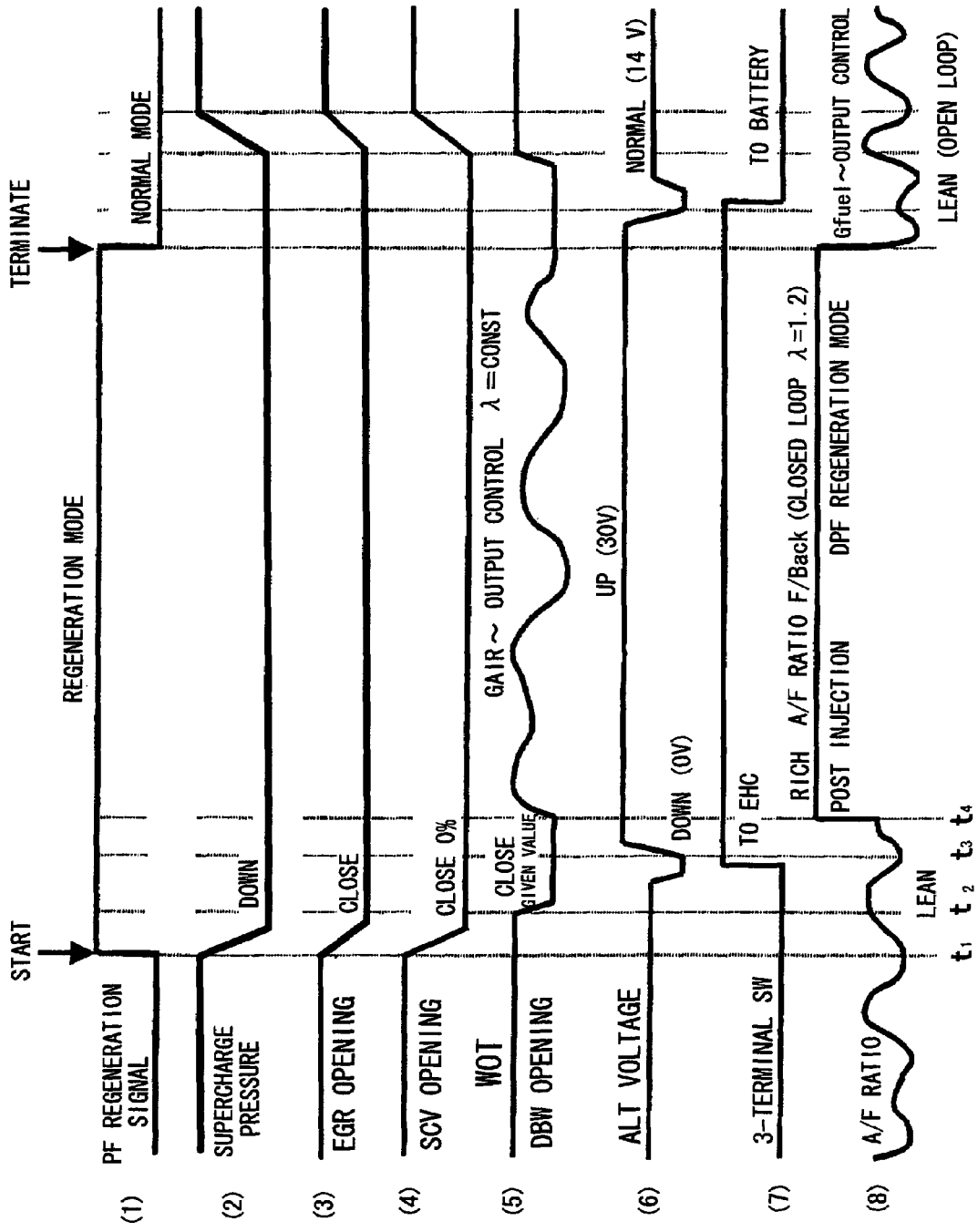
FIG. 3 is a timing chart for various valves, a generator and switches at a filter regeneration time.
Figure 4:
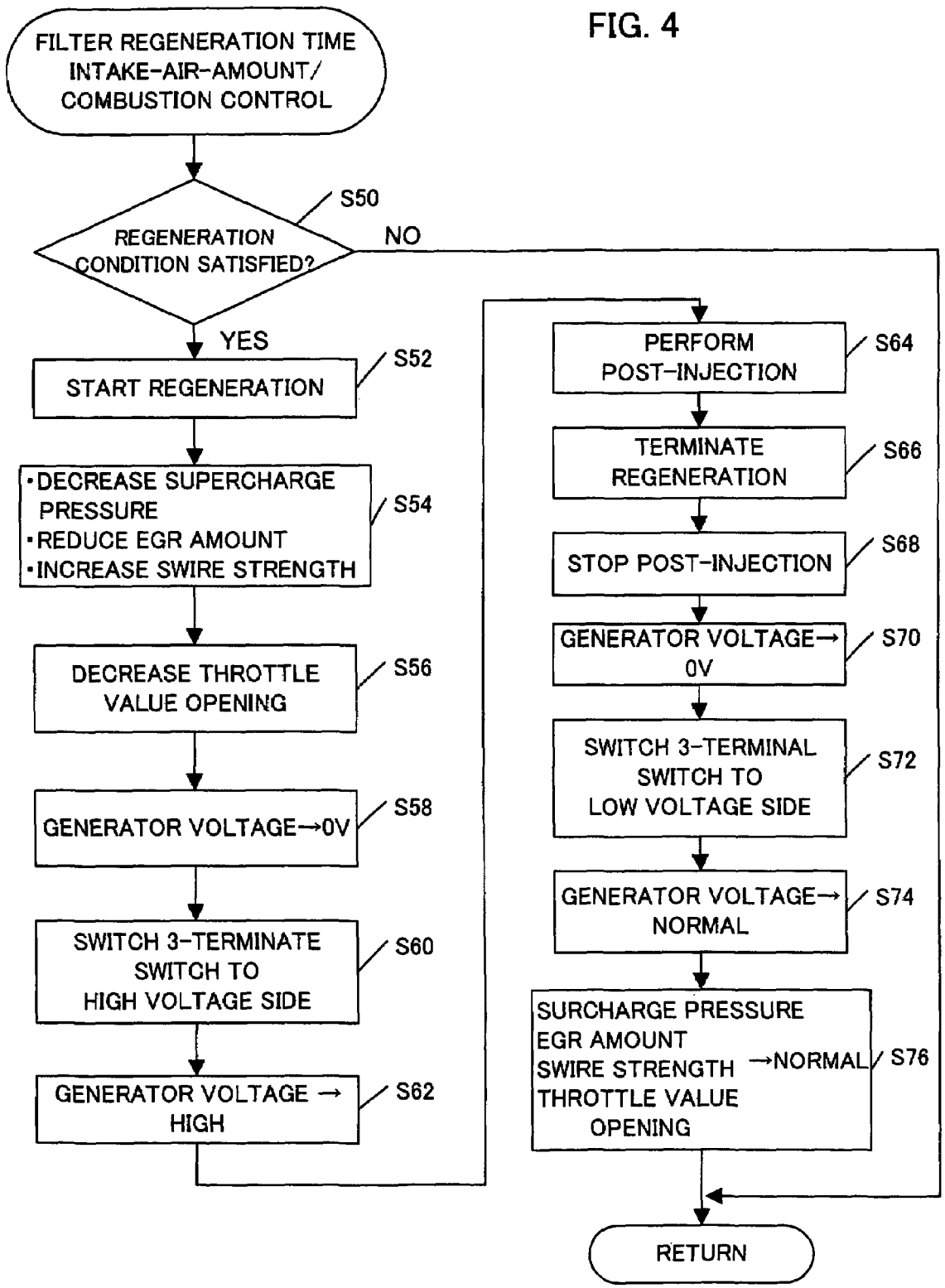
FIG. 4 is a flowchart of a process for a filter regeneration time intake-air-amount/combustion control.

A process to be performed by the control unit 24 for cleaning the particulate filter will now be described. FIG. 3 is a timing chart to show control states by each unit during filter cleaning. FIG. 4 is a flowchart of that process. In the following description, events in the timing chart in FIG. 3 are represented by a time t1 to t8 and each step in the flowchart in FIG. 4 is represented by a step number with a character "S".

When it is determined that the amount of the particulate reaches the predetermined value and the operational mode of the engine 1 is in such a condition that the filter regeneration process can be performed (S50), it is regarded that the start of the filter regeneration is determined at time t1 by the timing determination unit 21 as shown by the chart (1) in FIG. 3. Accordingly, the filter regeneration or cleaning mode starts. In response to the above-described regeneration start signal, as shown by the chart (2) of FIG. 3, the intake-air-amount/combustion control unit 24 reduces supercharging pressure of the supercharger (S54). Because the intake air amount is reduced according to this operation, the exhaust flow is reduced and the exhaust gas temperature rises.

Additionally and at the same time, as shown by the chart (3) of FIG. 3, the control unit 24 closes the EGR valve 9 to reduce the exhaust gas amount that is recirculated into the intake pipe (S54). Such an exhaust gas amount will be hereinafter referred to as "an EGR amount". It is basically preferable to increase the EGR amount and reduce the exhaust flow so as to raise the exhaust gas temperature and make the A/F ratio richer. However, according to the experiment by the inventors, there is a tendency that the emission is rather worsened in accordance with the increased EGR amount. Accordingly, the EGR is reduced in this embodiment. However, the EGR amount may be controlled so as to be increased as long as the emission does not deteriorate.

Furthermore, as shown by the chart (4) of FIG. 3, the control unit 24 closes the swirl control valve (SCV) 4 to increase the swirl strength (S54). This operation is performed to increase the swirl strength to promote combustion in the combustion chamber when the intake air amount is decreased causing insufficient supply of oxygen to a combustion reaction section of the combustion chamber.

Moreover, as shown by the chart (5) of FIG. 3, the control unit 24 closes the throttle valve (DBW) 3 to reduce the intake air amount (S56). Accordingly, the exhaust flow decreases and the exhaust gas temperature rises.

Steps S54 through S56 are performed in order to maintain the combustion in the engine in a desired condition and avoid deterioration of the emission during the filter regeneration process while the exhaust gas temperature is raised by reduction of the exhaust flow for cleaning the particulate filter.

As for the diesel engine, the exhaust gas temperature tends to become lower because the lean burn operation with excessive air is performed in almost all operation ranges. Therefore, the increase of the exhaust gas temperature only by reduction of the intake air amount is not sufficient to raise the temperature of the particulate filter up to a certain degree required for burning and removing the particulates. Thus, the control unit 24 starts the power supply to the electric heater 11 in response to the regeneration start signal. Control operations for this purpose are illustrated by the charts (6) and (7) in FIG. 3.

At first, the voltage of the generator 26 is temporarily decreased to 0V (S58). This is required to avoid generation of arc discharge between the terminals of the switch if the switch 31 with certain voltage is released. Then, the three-terminal switch 31 is switched to the side of the electric heater 11 (S60). At time t3, after switching, the voltage of the generator that supplies the electric power to the electric heater 11 rises from the normal low voltage (for example, 14V) to the high voltage (for example, 30V) (S62). This is performed to increase the voltage to improve the power transmission efficiency so as to quickly raise the temperature of the electric heater 11.

Then, the post-injection of the fuel for regenerating the particulate filter starts at time t4 (S64). It should be noted that a certain time is required until the temperature of the fuel supplied by the post-injection operation rises to a necessary degree for reacting with the electric heater 11 after the power supply to the electric heater is started because the thermal capacity of the electric heater 11 is large. Considering this point, the post-injection is started when a predetermined time period elapses (for example, five seconds) after the power supply to the electric heater is started. This operation is performed in order to prevent the fuel in a liquid state from sticking to the particulate filter or from being released to the atmosphere due to the post-injection performed while the temperature of the heater is still not raised enough to make the fuel react.

In this embodiment of the present invention, a feedback control for the air/fuel ratio is carried out during this post-injection operation. The feedback control for the air/fuel ratio can be performed even in the diesel engine in which the lean burn operation is basically carried out. This is because enrichment of the air/fuel ratio by the post-injection allows for the air/fuel ratio being converged within a detection range of the normal LAF sensor. The process of this A/F feedback control will be more specifically described later.

At time t5, when termination of the regeneration is determined by the timing determination unit 21, the filter regeneration process is finished and the operation is shifted to the normal mode (S66). Accordingly, as shown by the chart (8) in FIG. 3, the feedback control of the air/fuel ratio terminates and the operation returns to the open control. Also, the voltage of the generator 26 is once dropped to 0V (S70) and then it is returned to the normal voltage (S74) after the three-terminal switch 31 is switched to the low voltage side (S72). Then, the supercharger, the EGR amount, the swirl strength and the throttle valve opening return to the respective normal state (S76).

The above-described various operations during the regeneration process for the particulate filter allow for avoiding the following phenomena:
1) deterioration of fuel consumption,
2) engine damage due to dilution of the fuel to the oil or contamination by the PM,
3) deterioration of drivability due to increase of the output, and
4) incapability of burning out the fuel within a given time period.

Figure 5:
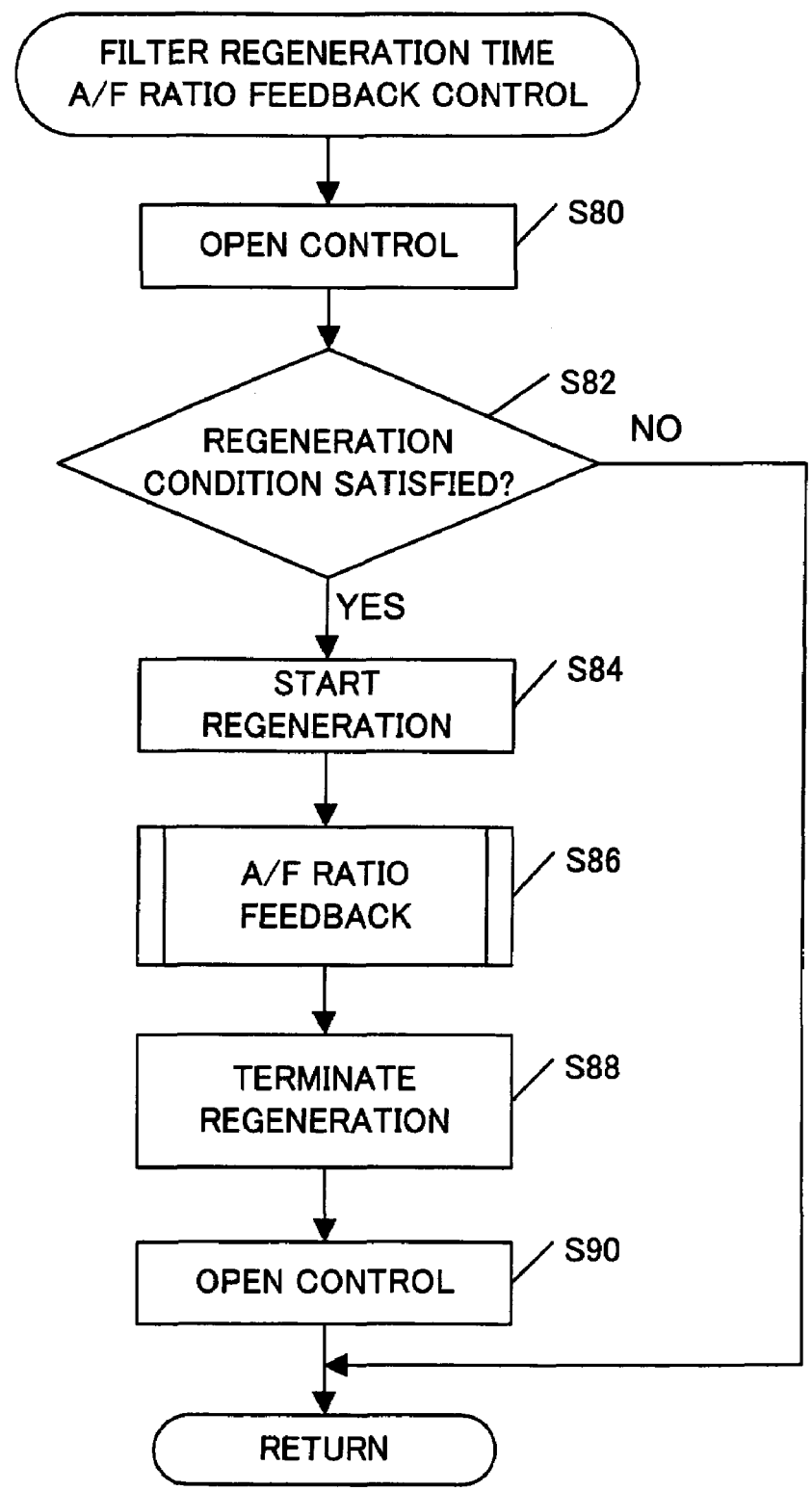
FIG. 5 is a flowchart of a process for a filter regeneration time A/F ratio feedback control.

Now, a process performed by the feedback control unit 23 during the particulate filter regeneration time will be described. FIG. 5 shows a flowchart of that process.

When the engine 1 is in an open loop control (S80), a condition for the filter regeneration is satisfied (S82), and a filter regeneration start signal is output (S84), a feedback control unit 23 detects the output of the LAF sensor 14 and starts a feedback control for the air/fuel ratio in order to control the exhaust air/fuel ratio such that it converges to a predetermined desired air/fuel ratio (S86). The desired air/fuel ratio is set to be about $1<\lambda<1.3$ by which the exhaust gas temperature can be kept higher and the detection precision of the LAF sensor 14 can be higher. When a filter regeneration termination signal is output (S88), the feedback control terminates and the operation returns to the normal open loop control (S90).

As for the feedback control for the air/fuel ratio in S86, there are two embodiments implementing the feedback control. The first embodiment is a scheme of correcting the fuel injection amount, and the second embodiment is a scheme of correcting the intake air amount through the control of the throttle valve 3. Each scheme will be described below.

EMBODIMENT 1 (CORRECTION OF THE FUEL INJECTION AMOUNT)

Figure 6:
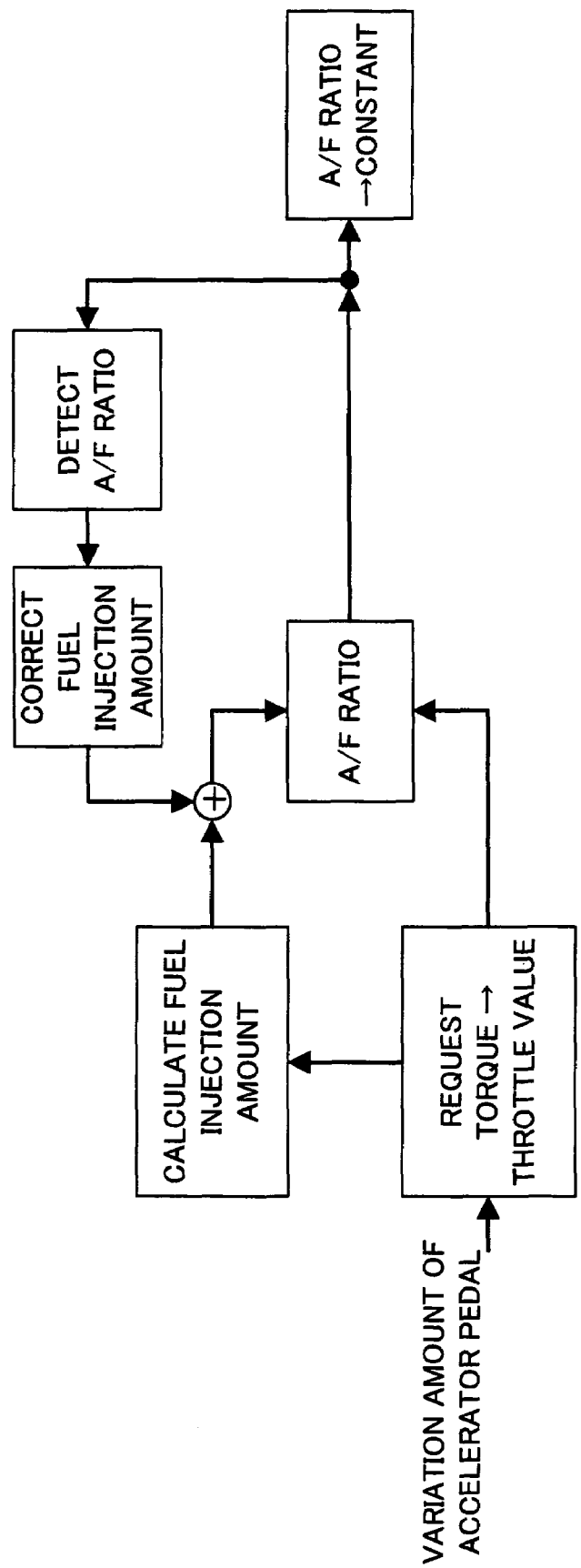
FIG. 6 is a block diagram showing one embodiment of an A/F ratio feedback control loop.
Figure 7:
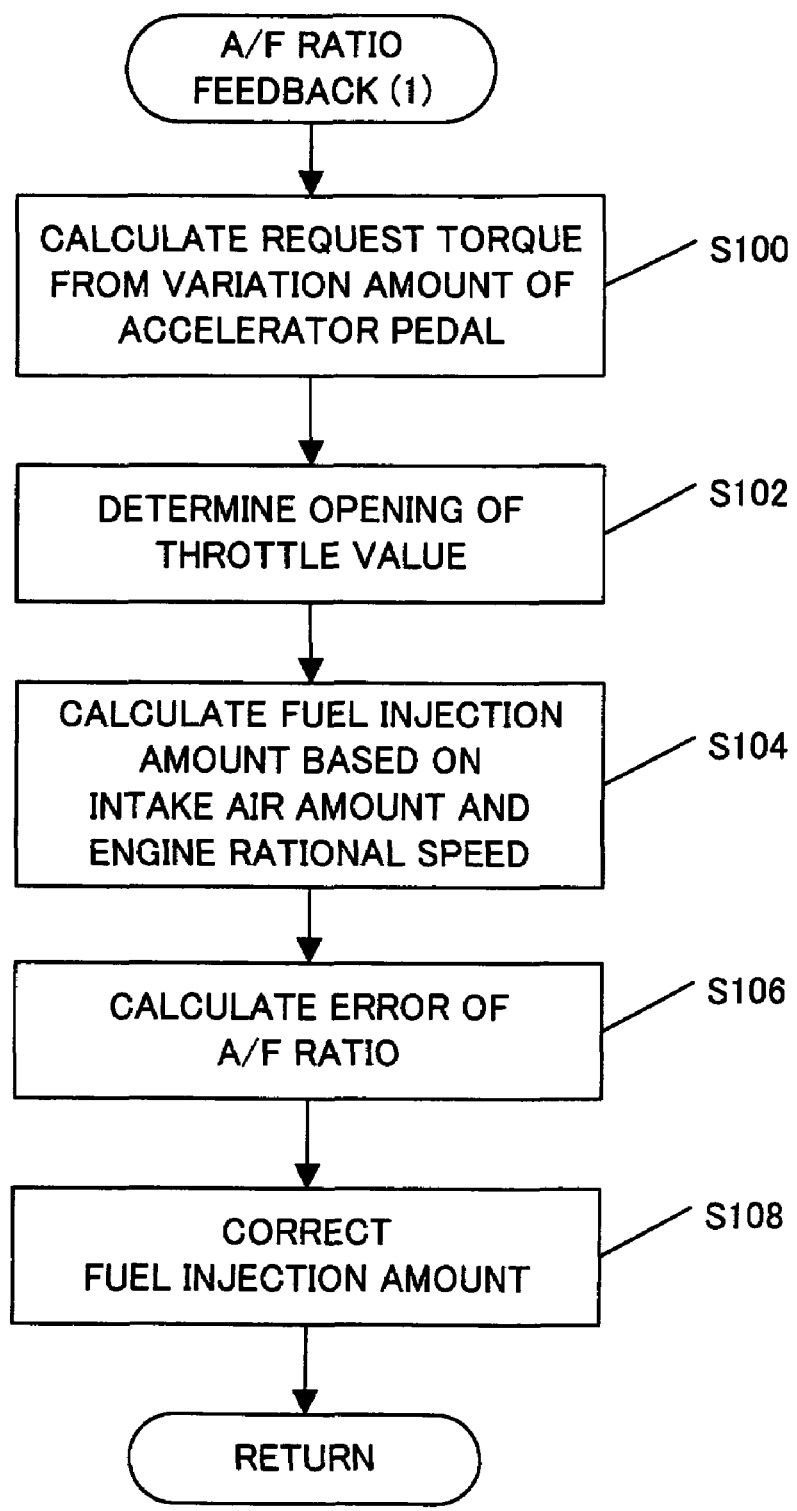
FIG. 7 is a flowchart of a process for the A/F ratio feedback control corresponding to the embodiment shown in FIG. 6.

FIG. 6 shows the first embodiment of the air/fuel ratio feedback loop. This embodiment controls the air/fuel ratio of the exhaust gas to be constant during the particulate filter regeneration process by detecting the air/fuel ratio of the exhaust gas and corrects the fuel injection amount based on the detected air/fuel ratio. A flowchart of this process is shown in FIG. 7.

At first, a variation amount of the accelerator pedal is detected to calculate a request torque (S100). The throttle valve is opened in accordance with the request torque, so that the air is taken in (S102). Next, a map that is predetermined with respect to intake air amounts and engine rotational speeds is searched to calculate the fuel injection amount (S104), for combustion in the engine 1. Next, an error between the exhaust air/fuel ratio detected by the LAF sensor 14 and the desired air/fuel ratio for the exhaust gas is calculated (S106), a post-injection amount is calculated based on the calculated error (S108), and the injection is performed during an exhaust stroke of the engine 1. The injected fuel, together with the exhaust gas, flows through the exhaust pipe 6, so that regeneration of the particulate filter 13 is carried out.

EMBODIMENT 2 (CORRECTION OF THE INTAKE AIR AMOUNT)

Figure 8:
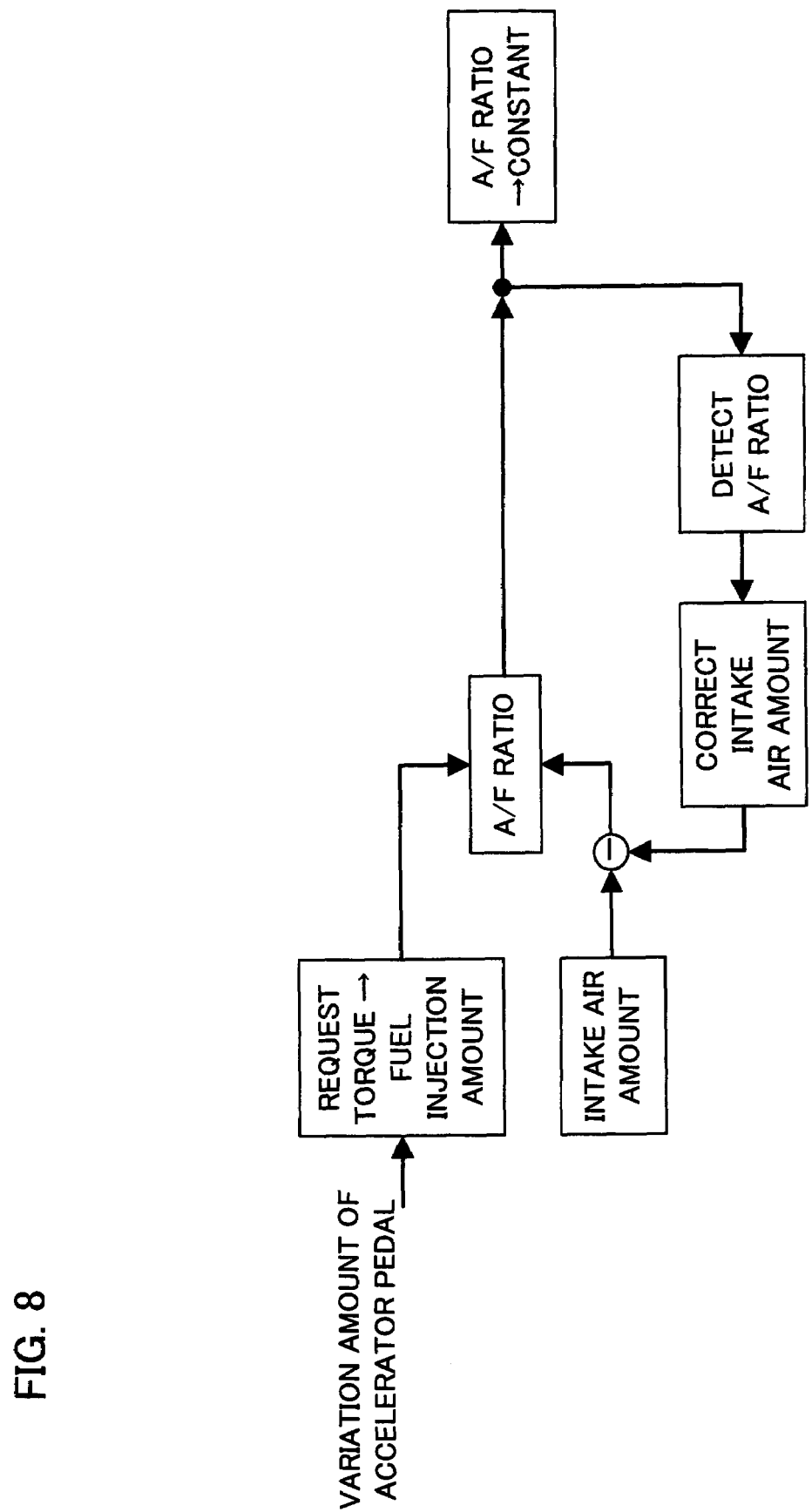
FIG. 8 is a block diagram showing another embodiment of an A/F ratio feedback control loop.
Figure 9:
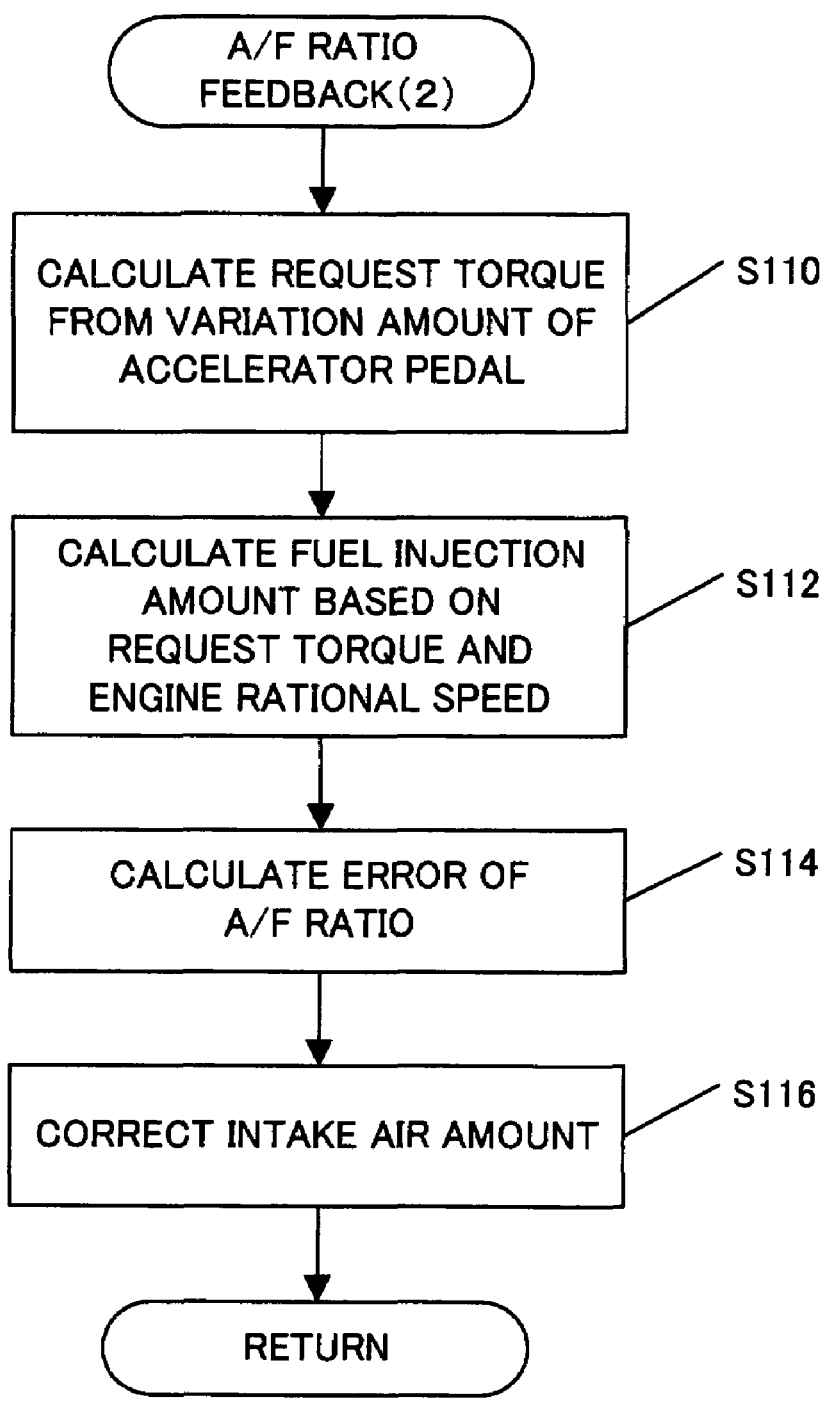
FIG. 9 is a flowchart of a process for the A/F ratio feedback control corresponding to the embodiment shown in FIG. 8.

Even though the embodiment 1 allows for achievement of the objective that the exhaust air/fuel ratio be kept constant, it is preferable to extend a conventional approach to perform an air/fuel feedback control rather than newly providing the means for calculating the fuel injection amount because the ordinary diesel engine control adopts an open loop control by which the fuel is supplied in accordance with the accelerator opening regardless of the intake air amount. Therefore, as shown in FIG. 8, the second embodiment of the air/fuel ratio feedback loop controls the air/fuel ratio of the exhaust gas to be constant during the particulate filter regeneration process by detecting the air/fuel ratio of the exhaust gas and correcting the intake air amount to be taken into the engine 1 based on the detected air/fuel ratio. A flowchart of this process is shown in FIG. 9.

At first, a variation amount of the accelerator pedal is detected to calculate a request torque (S110). Then, a map that is predetermined with respect to the request torque and the engine rotational speed is searched to calculate the fuel injection amount (S104) to be injected to the combustion chamber (S112), for combustion in the engine 1. The exhaust gas flows into the exhaust pipe 6. Next, an error between the exhaust air/fuel ratio detected by the LAF sensor 14 and the desired air/fuel ratio for the exhaust gas is calculated (S114), and the throttle valve opening is controlled to correct the intake air amount based on the calculated error so that the air fuel ratio of the exhaust gas discharged from the combustion chamber of the engine 1 can converge to the desired air/fuel ratio (S116). As described above, the air/fuel ratio is kept constant by performing the air/fuel ratio feedback control during the regeneration process for the particulate filter. As a result, following advantages are obtained.

At first, by keeping the air/fuel ratio constant, the output can be stabilized and the deterioration of the operational characteristics can be prevented. Besides, the emission becomes stable and the exhaust gas temperature becomes stable, too. Furthermore, as the air/fuel ratio becomes constant, the heat generated in the exhaust gas purification device becomes stable accordingly. As a result, the temperature of the particulate filter can be stabilized, no abnormal rise in the temperature happens and the combustion never stops. In addition, there is almost no possibility of melting loss or damage upon the particulate filter.

Besides, by using the exhaust gas purification device according to the present invention, the regeneration process for the particulate filter can be carried out while the engine is running. Accordingly, it is neither required to dismount the particulate filter for washing, nor required to connect the particulate filter with the external power source for heating.

Thus, according to the present invention, when an estimated amount of the particulates that are trapped by a particulate filter exceeds a threshold value, a particulate filter regeneration process is performed to regenerate the particulate filter by raising the exhaust gas temperature to burn and remove the particulates. At this time, the intake air amount is reduced and the combustion condition in the internal-combustion engine is kept optimal. Accordingly, deterioration of the emission during the filter regeneration process can be avoided while the exhaust gas temperature is being raised.

What is claimed is:

1. An exhaust gas purification device for an internal-combustion engine, said device comprising:
    a particulate filter disposed in an exhaust system of the engine for trapping particulates contained in the exhaust gas;
    timing determining means for determining a regeneration timing to remove the particulates trapped by the particulate filter;
    intake air amount reducing means for reducing an intake air amount to be taken into the internal-combustion engine in response to the determination of the regeneration timing;
    combustion maintaining means for maintaining combustion in the engine in a desired condition in response to reduction of the intake air amount; and
    heating means for heating the particulate filter to regenerate the particulate filter;
    wherein said device is configured to supply unburned fuel into the exhaust gas when a predetermined time elapses after the heating means started to be activated.

2. An exhaust gas purification device of claim 1, wherein said combustion maintaining means performs a feedback control to converge an air/fuel ratio in the exhaust system of the internal-combustion engine to a predetermined desired air/fuel ratio when the intake air amount is reduced by the intake air amount reducing means.

3. An electronic control unit for an internal-combustion engine having a particulate filter disposed in an exhaust system of the engine for trapping particulates contained in the exhaust gas, said electric control unit being programmed to:
    determine a cleaning timing to remove the particulates trapped by the particulate filter;
    reduce an intake air amount to be taken into the internal-combustion engine in response to the determination of the cleaning timing;
    maintain combustion in the engine in a desired condition in response to the reduction of the intake air amount; and
    heat the particulate filter to clean the particulate filter;
    wherein said electronic control unit is programmed to supply unburned fuel into the exhaust gas when a predetermined time elapses after the particulate filter started heating.

4. The electronic control unit of claim 3, wherein said electric control unit is further programmed perform a feedback control to converge an air/fuel ratio in the exhaust system of the internal-combustion engine to a predetermined desired air/fuel ratio when the intake air amount is reduced by the intake air amount reducing means.

5. A method for purifying an exhaust gas for an internal-combustion engine having a particulate filter disposed in an exhaust system of the engine for trapping particulates contained in the exhaust gas, comprising the step of:
    determining a cleaning timing to remove the particulates trapped by the particulate filter;
    reducing an intake air amount to be taken into the internal-combustion engine in response to the determination of the cleaning timing;
    maintaining combustion in the engine in a desired condition in response to the reduction of the intake air amount; and
    heating the particulate filter to clean the particulate filter;
    wherein the unburned fuel is supplied to the exhaust gas when a predetermined time elapses after the particulate filter started heating.

6. A method of claim 5, further comprising the step of performing a feedback control to converge an air/fuel ratio in the exhaust system of the internal-combustion engine to a predetermined desired air/fuel ratio when the intake air amount is reduced by the intake air amount reducing means.

* * * * *